United States Patent
Liles et al.

(10) Patent No.: US 7,287,250 B2
(45) Date of Patent: Oct. 23, 2007

(54) METHOD, COMPUTER PROGRAM PRODUCT, AND SYSTEM FOR INSTALLING AN OPERATING SYSTEM FROM A STORAGE DEVICE USING A SECTOR OFFSET

(75) Inventors: Terry Wayne Liles, Round Rock, TX (US); T. Gavin Smith, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 671 days.

(21) Appl. No.: 09/845,953

(22) Filed: Apr. 30, 2001

(65) Prior Publication Data
US 2002/0162100 A1    Oct. 31, 2002

(51) Int. Cl.
*G06F 9/445* (2006.01)
*G06F 12/00* (2006.01)

(52) U.S. Cl. ........................ 717/174; 711/173
(58) Field of Classification Search .................. 717/174
See application file for complete search history.

(56) References Cited

U.S. PATENT DOCUMENTS

| | | | |
|---|---|---|---|
| 5,787,491 A | | 7/1998 | Merkin et al. .............. 711/173 |
| 6,351,850 B1 * | | 2/2002 | van Gilluwe et al. ....... 717/175 |
| 6,557,169 B1 * | | 4/2003 | Erpeldinger ................ 717/178 |
| 6,615,365 B1 * | | 9/2003 | Jenevein et al. ................ 714/6 |
| 6,681,323 B1 * | | 1/2004 | Fontanesi et al. ........... 717/174 |

* cited by examiner

*Primary Examiner*—Tuan Dam
*Assistant Examiner*—Michael J Yigdall
(74) *Attorney, Agent, or Firm*—Haynes and Boone, LLP

(57) ABSTRACT

A method, computer program product, and system that include identifying a sector offset on a storage device and storing an image onto the storage device at the sector offset where the image includes an operating system. The method also includes providing the sector offset to an installation engine and, subsequent to storing the image on the storage device, initiating the installation engine to cause the operating system to be installed on the storage device using the image.

22 Claims, 4 Drawing Sheets

METHOD, COMPUTER PROGRAM PRODUCT, AND SYSTEM FOR INSTALLING AN OPERATING SYSTEM FROM A STORAGE DEVICE USING A SECTOR OFFSET

BACKGROUND

The disclosures herein relate generally to build-to-order computer systems and more particularly to a method, computer program product, and system for installing an operating system from a storage device using a sector offset. This application relates to co-pending U.S. patent application Ser. No. 09/315,657, filed on May 20, 1999, entitled "Method and Apparatus for Windows-Based Installation for Installing Software on Build-to-Order Computer Systems", naming Bobby G. Doran, Jr., Bill Hyden, and Terry Wayne Liles as inventors.

This application relates to co-pending U.S. patent application Ser. No. 09/333,786, filed on Jun. 15, 1999, entitled "Method and Apparatus for Testing Custom-Configured Software/Hardware Integration in a Computer Build-to-Order Manufacturing Process", naming Thomas Vrhel Jr., Gaston M. Barajas, Paul J. Maia, and W. D. Todd Nix as inventors.

This application relates to U.S. Pat. No. 6,041,395, filed on Dec. 3, 1997, entitled "System and Method for Changing Partition Mappings to Logical Drives in a Computer Memory", naming Alan E. Beelitz as inventor.

The patent and co-pending applications are incorporated by reference in their entirety, and are assigned to the assignee of this application.

In the process of manufacturing a build-to-order computer system, a computer manufacturer typically installs an operating system onto the build-to-order computer system. In the build-to-order model, the operating system to be installed may be selected by a customer from one of a number of different operating systems. Each operating system may come from a different operating system vendor and may have a vendor-specific installation engine for installing the operating system in a computer system. Because the installation engine for each operating system is vendor-specific, each operating system typically requires significant development effort by a computer manufacturer to incorporate the installation of a particular operating system into the manufacturing process.

It would be desirable for a computer manufacturer to be able to minimize the development effort required to incorporate an operating system in a build-to-order manufacturing process. Accordingly, what is needed is a method, computer program product, and system for installing an operating system from a storage device using a sector offset.

SUMMARY

One embodiment, accordingly, provides a method that includes identifying a sector offset on a storage device and storing an image onto the storage device at the sector offset where the image includes an operating system. The method also includes providing the sector offset to an installation engine and, subsequent to storing the image on the storage device, initiating the installation engine to cause the operating system to be installed on the storage device using the image.

A principal advantage of this embodiment is that it provides a computer manufacturer with the ability to automate the installation of different operating systems in the manufacturing process. The embodiment may allow a computer manufacturer to provide computer systems to customers in a more cost-effective manner.

DETAILED DESCRIPTION

Figure 1:
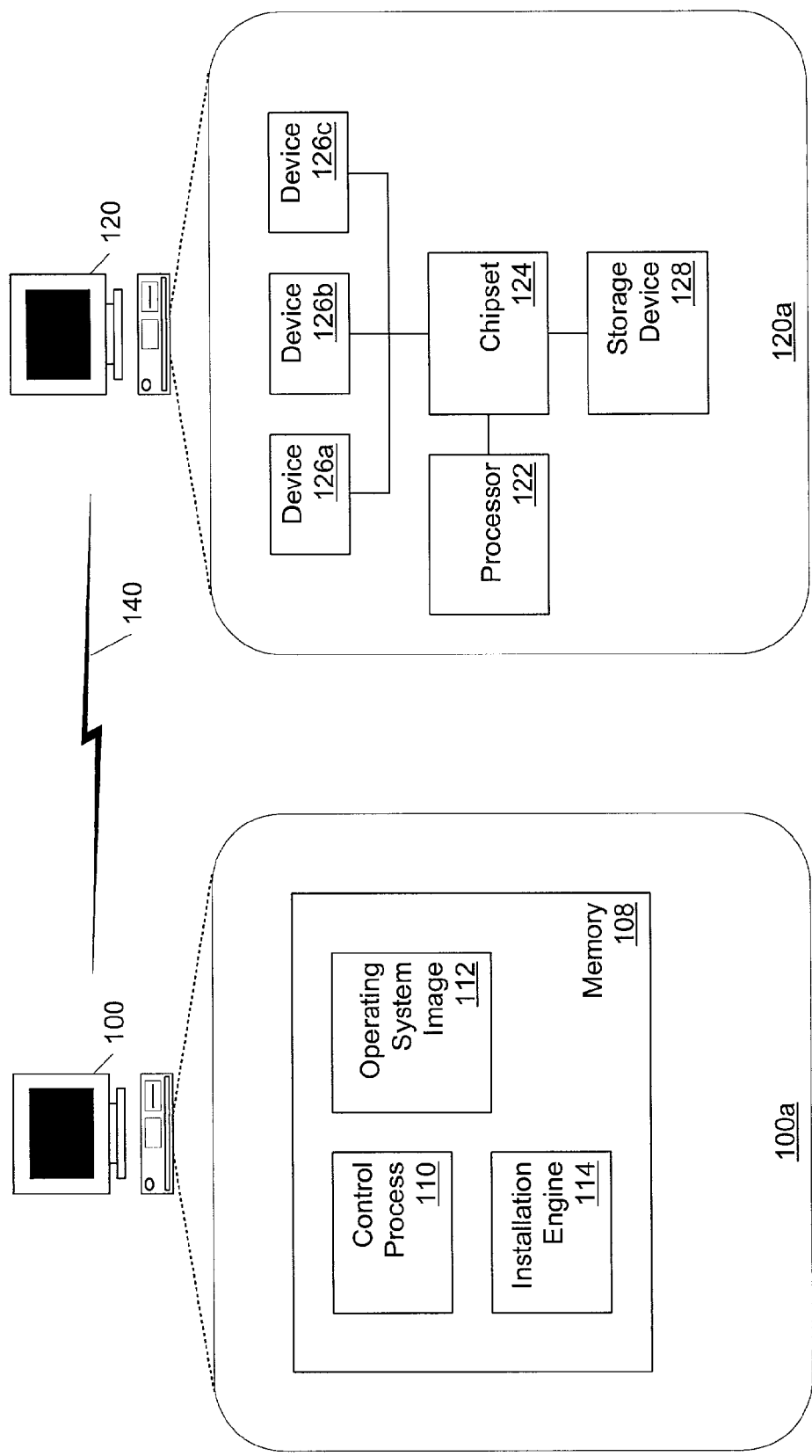
FIG. 1 is a diagram illustrating an embodiment of a build-to-order computer system coupled to a server.

FIG. 1 is a diagram illustrating an embodiment of a build-to-order computer system 120 configured to communicate with a server 100. Computer system 120 may be coupled to server 100 in any suitable way as indicated by a connection symbol 140. Connection symbol 140 represents a computer network, a direct electrical connection, a wireless connection, or any other connection configured to allow server 100 and computer system 120 to communicate.

In the embodiment of FIG. 1, server 100 is a computer system that is configured to cause an operating system to be installed on computer system 120 during a manufacturing process. Accordingly, server 100 includes a memory 108 configured to store a control process 110, an operating system image 112, and an installation engine 114 as shown in a box 100a. Operating system image 112 includes an operating system configured to run on computer system 120. Control process 110 is executable to cause the operating system included in operating system image 112 to be installed on computer system 120 using installation engine 114.

As indicated by a box 120a, computer system 120 includes a chipset 124 coupled to a processor 122, a plurality of devices 126a, 126b, and 126c, and a storage device 128. Other embodiments of computer system 120 are possible and contemplated.

To install operating system image 112 onto storage device 128 on computer system 120, control process 110 locates storage device 128 and identifies a sector offset on storage device 128 where control process 110 will cause operating system image 112 to be stored. As used herein, the term sector offset defines a physical location on a storage device, such as storage device 128, without reference to a logical address associated with the storage device. The sector offset is determined by control process 110 prior to an operating system being installed on computer system 120. Accordingly, the sector offset is determined by control process 110 prior to storage device 128 being partitioned into one or more logical drives. In this way, the sector offset defines a physical location on storage device 128 without reference to a logical address. Control process 110 may determine the sector offset in conjunction with a basic input output system (BIOS) (not shown) on computer system 120. The BIOS may be configured to communicate with storage device 128.

Control process 110 causes the sector offset to be selected such that operating system image 112 will not be overwritten in response to the operating system contained in operating system image 112 being installed onto storage device 128. Accordingly, control process 110 may cause the sector offset to be selected in response to the size and/or other characteristics of the operating system, the size of operating system image 112, and the size of storage device 128.

After a sector offset is identified, control process 110 causes operating system image 112 to be stored on storage device 128 beginning at the sector offset. In one embodiment, control process 110 uses the BIOS of computer system 120 to cause operating system image 112 to be stored on storage device 128 at the sector offset. In other embodiments, other software tools may be developed to communicate with storage device 128. These software tools may or may not be integrated with control process 110. In the embodiment shown in FIG. 1, control process 110 stores operating system image 112 onto storage device 128 by copying operating system image 112 from memory 108 to storage device 128 using network 140. In another embodiment (not shown), control process 110 stores operating system image 112 onto storage device 128 by copying operating system image 112 from a CD-ROM to storage device 128. The CD-ROM may be coupled to either server 100 or computer system 120.

Control process 110 then provides the sector offset to installation engine 114 to cause installation engine 114 to install the operating system in operating system image 112 onto computer system 120 using the copy of operating system image 112 stored on storage device 128. In one embodiment, control process 110 may copy installation engine 114 onto storage device 128 along with operating system image 112 to allow installation engine 114 to execute on computer system 120. In other embodiments, installation engine 114 may execute from server 100 or other computer systems.

As part of installing the operating system, installation engine 114 may perform a formatting operation on storage device 128. For example, installation engine 114 may store information associated with storage device 128 and/or other devices on storage device 128 for use by the operating system. In addition, installation engine 114 may partition storage device 128 and/or other storage devices in computer system 120 as part of installing the operating system. Installation engine 114 may also cause a log file associated with the installation to be created and stored on storage device 128. The log file may include details of the installation including any problems or failures encountered during the installation.

It may be noted that operating system image 112 may not be visible to the operating system after the operating system is installed. Although operating system image 112 may still be present in storage device 128, no file system or partition information associated with operating system image 112 may exist because operating system image 112 was present before the operating system was installed. Accordingly, the operating system does not detect operating system image 112 on storage device 128 and the operating system may eventually overwrite the space occupied by operating system image 112 with other information.

Figure 2A:
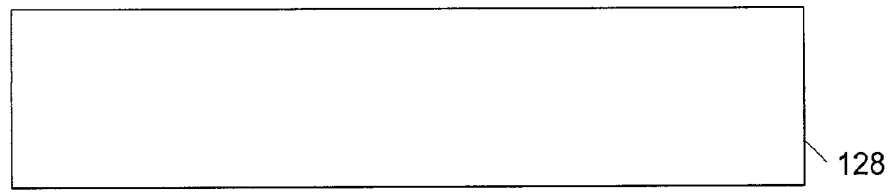
FIG. 2a is a first diagram illustrating a first example of installing an operating system on a storage device using a sector offset.
Figure 2B:
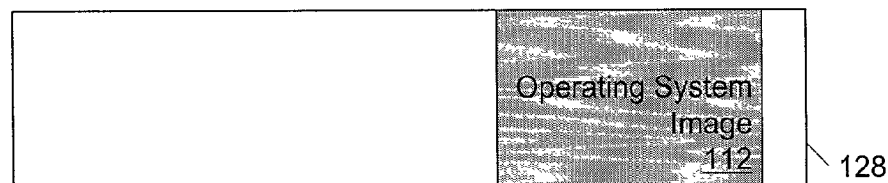
FIG. 2b is a second diagram illustrating a first example of installing an operating system on a storage device using a sector offset.
Figure 2C:
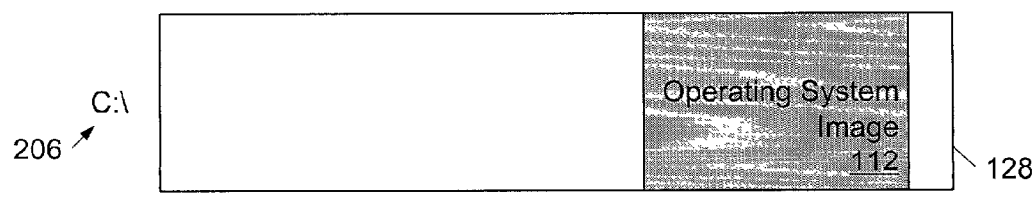
FIG. 2c is a third diagram illustrating a first example of installing an operating system on a storage device using a sector offset.

FIGS. 2*a*, 2*b*, 2*c*, and 2*d* are diagrams illustrating a first example of installing an operating system on storage device 128 using a sector offset using the embodiment of FIG. 1. As shown in FIG. 2*a*, storage device 128 is blank initially when it is detected by control process 110. In this example, control process 110 determines a sector offset 204 based primarily on the size of operating system image 112. Accordingly, control process 110 calculates sector offset 204 such that operating system image 112 will be stored at or near the highest address of storage device 128. As shown in FIG. 2*b*, control process 110 causes operating system image 112 to be stored onto storage device 128 beginning at sector offset 204 as indicated by a shaded region in FIG. 2*b*.

Figure 2D:
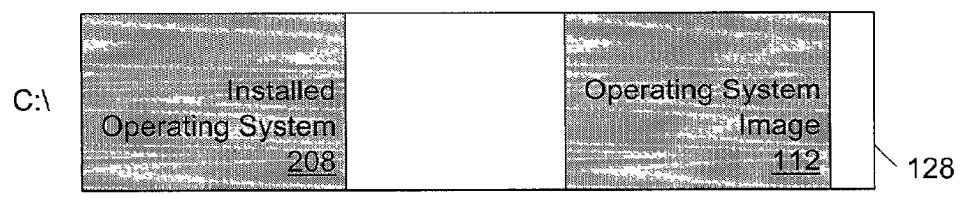
FIG. 2d is a fourth diagram illustrating a first example of installing an operating system on a storage device using a sector offset.

Control process 110 next provides sector offset 204 to installation engine 114. In this example, installation engine 114 executes on server 100 and control process 110 provides sector offset 204 to installation engine 114 using a function call to initiate installation engine 114. As part of installing the operating system, installation engine 114 partitions storage device 128 as indicated by a logical drive mapping C:\ 206 in FIG. 2*c*. As shown in FIG. 2*d*, installation engine 114 causes the operating system to be installed at the lowest address of storage device 128 as indicated by a shaded region 208 that includes the installed operating system.

Figure 3A:
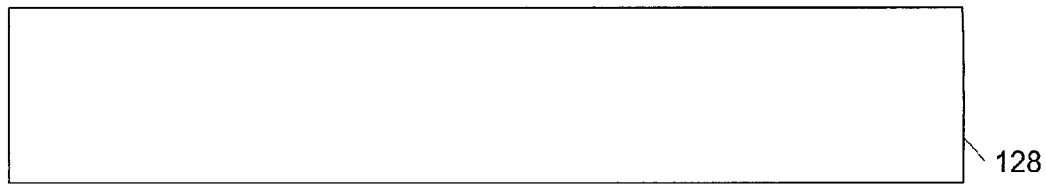
FIG. 3a is a first diagram illustrating a second example of installing an operating system on a storage device using a sector offset.
Figure 3B:
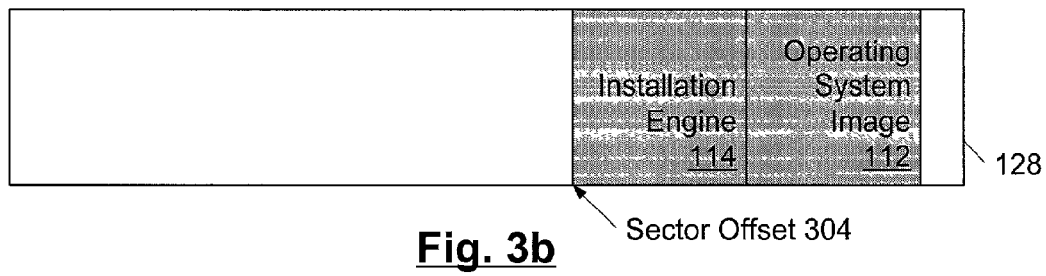
FIG. 3b is a second diagram illustrating a second example of installing an operating system on a storage device using a sector offset.

FIGS. 3*a*, 3*b*, 3*c*, and 3*d* are diagrams illustrating a first example of installing an operating system on storage device 128 using a sector offset using the embodiment of FIG. 1. As shown in FIG. 3*a*, storage device 128 is blank initially when it is detected by control process 110. In this example, control process 110 determines a sector offset 304 based primarily on the area on storage device 128 that the installed operating system will occupy. Accordingly, control process 110 calculates sector offset 304 such that operating system image 112 will be stored at location on storage device 128 that will not overlap with the area where the operating system will be installed. As shown in FIG. 3*b*, control process 110 causes installation engine 114 and operating system image 112 to be stored onto storage device 128 beginning at sector offset 304 as indicated by a shaded region in FIG. 3*b*.

Figure 3C:
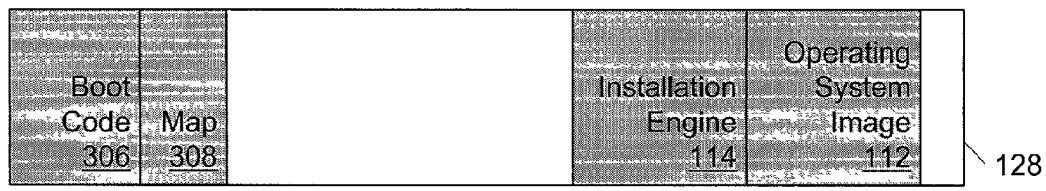
FIG. 3c is a third diagram illustrating a second example of installing an operating system on a storage device using a sector offset.

Referring now to FIG. 3*c*, control process 110 also causes a boot code 306 (not shown in FIG. 1) to be stored at the lowest address of storage device 128. Control process 110 further stores a map file 308 that includes sector offset 304 at a location known to boot code 306. Control process 110 then causes computer system 120 to be reset. In response to being reset, computer system 120 executes boot code 306. Boot code 306 includes instructions that cause map file 308 to be located and cause sector offset 304 to be detected. Boot code 306 then causes sector offset 304 to be provided to installation engine 114 and causes installation engine 114 to be initiated. By storing sector offset 304 in a location known to boot code 306, control process 110 causes sector offset 304 to be provided to installation engine 114 using a predetermined location on storage device 128.

Figure 3D:
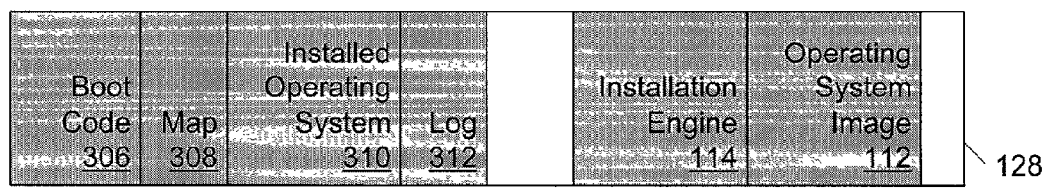
FIG. 3d is a fourth diagram illustrating a second example of installing an operating system on a storage device using a sector offset.

In this example, installation engine 114 executes on computer system 120. Installation engine 114, once initiated, may partition and/or format storage device 128 and may overwrite boot code 306 and/or map 308. As shown in FIG. 3*d*, installation engine 114 causes the operating system to be installed on storage device 128 as indicated by a shaded region 310 that includes the installed operating system. Installation engine 114 also causes a log file 312 to be created and stored on storage device 128 to store information associated with the installation of the operating system.

As may be seen from the examples described above, many variations on the process of installing an operating system on a storage device are contemplated. For example, the sector offset may be determined and provided to an installation engine in ways other than those described above. Also, the installation engine may be executed by one or more computer systems different from those shown in FIG. 1. Further, one or more functions described above as being performed by control process 110 may be performed in conjunction with a human user.

In addition, many variations from the embodiment of FIG. 1 are possible and contemplated. For example, server 100 and/or computer system 120 may include different types or numbers of the components shown in FIG. 1. In addition, control process 110, operating system image 112, and installation engine 114 may be stored in different memories on different computer systems. Further, memory 108 may be any type of storage apparatus configured to store information.

In other embodiments, computer system 120 or another computer system operatively coupled to computer system 120 may execute control process 110. In addition, control process 110 may access operating system image 112 from a storage apparatus located externally from server 100 such as a CD-ROM device coupled to computer system 120. Prior to being stored onto server 100, control process 110 may be stored onto any suitable storage apparatus such as a CD-ROM or floppy disk that is accessible by computer system 120 or server 100.

Figure 4:
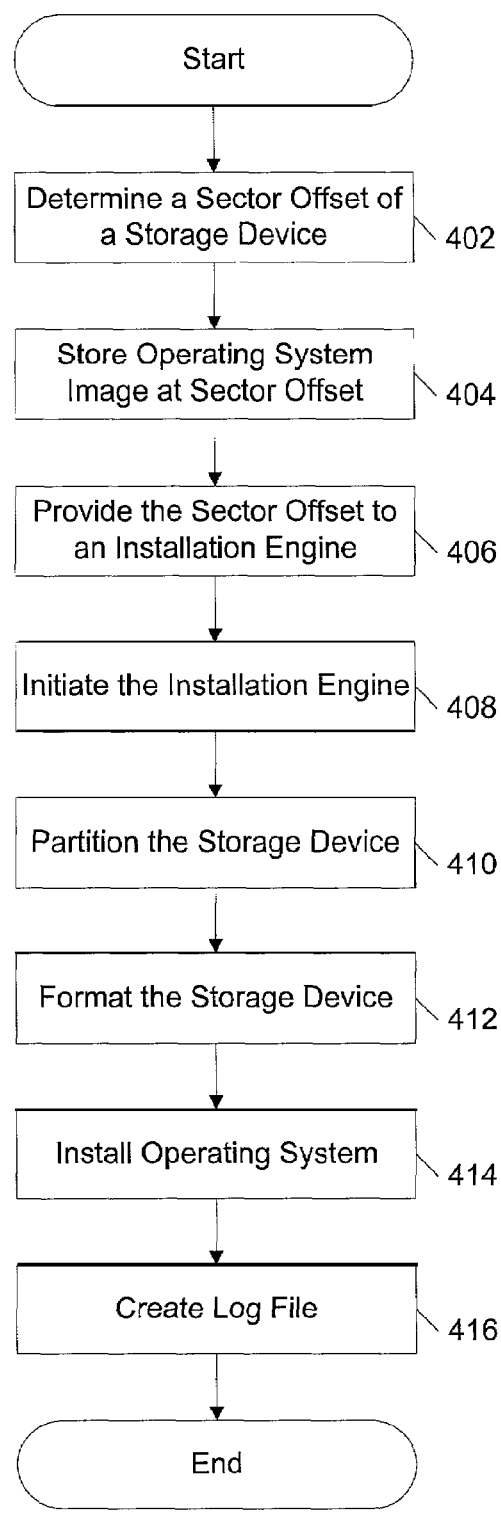
FIG. 4 is a flow chart illustrating an embodiment of a method for installing an operating system on a storage device using a sector offset.

FIG. 4 is a flow chart illustrating an embodiment of a method for installing an operating system on a storage device using a sector offset. A sector offset of a storage device is determined as indicated in step 402. The sector offset may be determined using the size and/or other characteristics of an operating system, a size of an operating system image that includes the operating system, and/or a size of the storage device. An operating system image is stored at the sector offset as indicated in step 404. The sector offset is provided to the installation engine as indicated in step 406. The sector offset may be provided as part of a function call to the installation engine or may be stored in any location known to the installation engine. The installation engine is initiated as indicated in step 408. The storage device is partitioned as indicated in step 410. The storage device is formatted as indicated in step 412. The operating system is installed as indicated in step 414. A log file is created as indicated in step 416. In certain embodiments, steps 410, 412, and/or 416 may be omitted.

As can be seen, the principal advantages of these embodiments are that they provide a computer manufacturer with the ability to automate the installation of different operating systems in the manufacturing process. The embodiment may allow a computer manufacturer to provide computer systems to customers in a more cost-effective manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by a computer system comprising:

configuring a memory to store a control process;

in response to a size of a storage device and a size of an image to be stored on the storage device, identifying a sector offset on the storage device such that storage of the image on the storage device at the sector offset will result in the image being stored at or near a highest address of the storage device;

determining the sector offset by the control process prior to an operating system being installed on the computer system and prior to the storage device being partitioned;

storing the image onto the storage device at the sector offset by copying the image from the memory to the storage device;

providing the sector offset to an installation engine; and subsequent to storing the image on the storage device, initiating the installation engine to cause the operating system to be installed on the storage device using the image.

2. The method of claim 1, further comprising:

subsequent to initiating the installation engine, partitioning the storage device.

3. The method of claim 1, further comprising:

subsequent to initiating the installation engine, performing a formatting operation on the storage device.

4. The method of claim 1, further comprising:

providing the sector offset to the installation engine by storing the sector offset in a predetermined location on the storage device.

5. The method of claim 1, further comprising:

providing the sector offset to the installation engine by passing the sector offset as part of a function call to initiate the installation engine.

6. The method of claim 1, further comprising:

storing the image onto the storage device by copying the image from a CD-ROM.

7. The method of claim 1, further comprising:

storing the image onto the storage device by copying the image over a network.

8. A computer program product comprising:

a computer program processable by a computer system for causing the computer system to:

configure a memory to store a control process;

in response to a size of a storage device and a size of an image to be stored on the storage device, identify a sector offset on the storage device such that storage of the image on the storage device at the sector offset will result in the image being stored at or near a highest address of the storage device;

determine the sector offset by the control process prior to an operating system being installed on the computer system and prior to the storage device being partitioned;

store the image onto the storage device at the sector offset by copying the image from the memory to the storage device;

provide the sector offset to an installation engine; and subsequent to storing the image on the storage device, initiate the installation engine to cause the operating system to be installed on the storage device using the image; and an apparatus from which the computer program is accessible by the computer system.

9. The computer program product of claim 8, wherein the computer program is processable by the computer system to cause the computer system to:
   subsequent to initiating the installation engine, partition the storage device.

10. The computer program product of claim 8, wherein the computer program is processable by the computer system to cause the computer system to:
    subsequent to initiating the installation engine, perform a formatting operation on the storage device.

11. The computer program product of claim 8, wherein the computer program is processable by the computer system to cause the computer system to:
    provide the sector offset to the installation engine by storing the sector offset in a predetermined location on the storage device.

12. The computer program product of claim 8, wherein the computer program is processable by the computer system to cause the computer system to:
    provide the sector offset to the installation engine by passing the sector offset as part of a function call to initiate the installation engine.

13. The computer program product of claim 8, wherein the computer program is processable by the computer system to cause the computer system to:
    store the image onto the storage device by copying the image from a CD-ROM.

14. The computer program product of claim 8, wherein the computer program is processable by the computer system to cause the computer system to:
    store the image onto the storage device by copying the image over a network.

15. A system comprising:
    a computer system for:
       configuring a memory to store a control process;
       in response to a size of a storage device and a size of an image to be stored on the storage device, identifying a sector offset on the storage device such that storage of the image on the storage device at the sector offset will result in the image being stored at or near a highest address of the storage device;
       determining the sector offset by the control process prior to an operating system being installed on the computer system and prior to the storage device being partitioned;
       storing the image onto the storage device at the sector offset by copying the image from the memory to the storage device;
       providing the sector offset to an installation engine; and
       subsequent to storing the image on the storage device, initiating the installation engine to cause the operating system to be installed on the storage device using the image.

16. The system of claim 15, wherein the computer system is for:
    subsequent to initiating the installation engine, partitioning the storage device.

17. The system of claim 15, wherein the computer system is for:
    subsequent to initiating the installation engine, performing a formatting operation on the storage device.

18. The system of claim 15, wherein the computer system is for:
    providing the sector offset to the installation engine by storing the sector offset in a predetermined location on the storage device.

19. The system of claim 15, wherein the computer system is for:
    providing the sector offset to the installation engine by passing the sector offset as part of a function call to initiate the installation engine.

20. The system of claim 15, wherein the computer system is for:
    storing the image onto the storage device by copying the image from a CD-ROM.

21. The system of claim 15, wherein the computer system is for:
    storing the image onto the storage device by copying the image over a network.

22. A method performed by a computer system comprising:
    configuring a memory to store a control process;
    in response to a size of a storage device and a size of an image to be stored on the storage device, identifying a sector offset on the storage device such that storage of the image on the storage device at the sector offset will result in the image being stored at or near a highest address of the storage device;
    determining the sector offset by the control process prior to an operating system being installed on the computer system and prior to the storage device being partitioned;
    storing the image onto the storage device at the sector offset by copying the image from the memory to the storage device over a network, the image including an operating system;
    providing the sector offset to an installation engine by storing the sector offset in a predetermined location on the storage device;
    subsequent to storing the image on the storage device, initiating the installation engine to cause the operating system to be installed on the storage device using the image; and
    subsequent to initiating the installation engine, performing a formatting operation on the storage device.

* * * * *